Patented Aug. 22, 1950

2,519,577

UNITED STATES PATENT OFFICE 2,519,577

PRODUCTION OF ARYL INDAN HYDROCARBONS

Vladimir N. Ipatieff and Herman Pines, Chicago, Ill., assignors to Universal Oil Products Company, Chicago, Ill., a corporation of Delaware No Drawing. Application June 30, 1948,
Serial No. 36,274

16 Claims. (Cl. 260—668)

This application is a continuation-in-part of our copending application Serial Number 619,430, filed September 29, 1945, now abandoned.

This invention relates to a process for producing aryl indan hydrocarbons and particularly for producing phenyl indan hydrocarbons and alkylated or cycloalkylated phenyl indan hydrocarbons.

An object of this invention is the production of an aryl indan hydrocarbon.

Another object of this invention is the production of an alkylated aryl indan hydrocarbon.

An additional object of this invention is the production of an alkylated phenyl indan.

A further object of this invention is the production of a 1,3,3,5-tetraalkyl-1-m-tolyl-indan.

A still further object of this invention is the production of 1,3,3,5-tetramethyl-1-m-tolylindan.

One specific embodiment of this invention relates to a process for producing an indan hydrocarbon which comprises reacting at hydrogen transfer conditions in the presence of an acid-acting catalyst a branched-chain olefin and a meta-di-alkylated benzene hydrocarbon having as one substituent an alkyl group containing only one hydrogen atom joined to the carbon atom combined with the benzene ring.

Another embodiment of this invention relates to a process for producing an aryl indan hydrocarbon which comprises reacting in the presence of an acid-acting catalyst an alkyl cyclohexene hydrocarbon and a meta-dialkyl benzene hydrocarbon having as one substituent an alkyl group containing only one hydrogen atom joined to the carbon atom combined with the benzene ring.

A further embodiment of this invention relates to a process for producing aryl indan hydrocarbons which comprises reacting at hydrogen transfer conditions in the presence of an acid-acting catalyst, a branched-chain olefin and a benzene hydrocarbon of the formula:

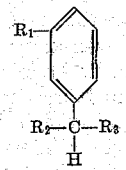

wherein each of $R_1$, $R_2$ and $R_3$ is selected from the group consisting of an alkyl radical, a cycloalkalkyl radical, a cycloalkyl radical, and a bicycloalkyl radical.

We have developed a method for producing indan hydrocarbons by effecting a hydrogen transfer reaction between a branched-chain olefinic hydrocarbon and an aromatic hydrocarbon containing at least two and not more than five hydrocarbon group substituents with two of said substituents in meta positions. One of said meta-substituents contains at least three carbon atoms and also a hydrogen atom combined with the carbon atom that is joined to the aromatic ring. The reaction is illustrated by the following equation wherein $x$ is selected from zero and the small even numbers 2, 4, etc., and $R_1$ and $R_2$ each represents a member of the group consisting of alkyl, cycloalkalkyl, cycloalkyl, and bicycloalkyl radicals and $R_3$ and $R_4$ each represent a member of the group consisting of a hydrogen atom and the radicals enumerated for $R_1$ and $R_2$. When $R_1$ and $R_2$ represent alkyl groups and $R_3$ and $R_4$ represent hydrogen atoms, the indan hydrocarbon formed as indicated in the following equation is a 1,3,3,5-tetraalkyl-1-m-tolyl-indan.

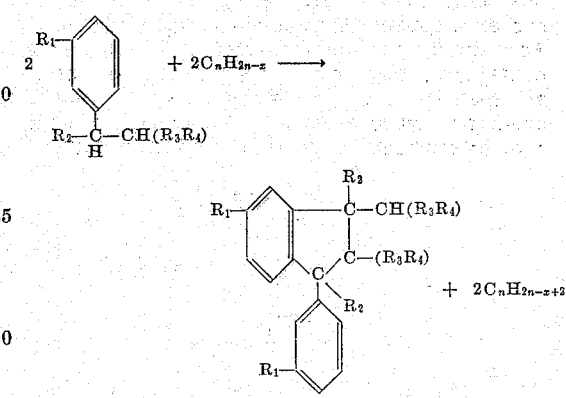

Similarly the production of 1,3,3,5-tetramethyl-1-m-tolyl-indan from m-cymene and 2-methyl-2-butene is indicated by the equation:

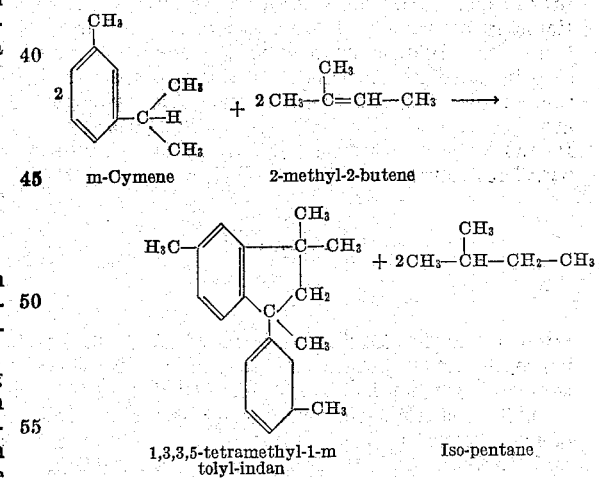

m-Cymene    2-methyl-2-butene 1,3,3,5-tetramethyl-1-m-tolyl-indan    Iso-pentane The formation of 1,3,3,5-tetramethyl-1-m-tolyl-indan by hydrogen transfer between m-cymene and a methylcyclohexene is illustrated by the following equation:

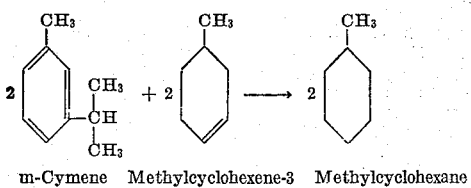

m-Cymene    Methylcyclohexene-3    Methylcyclohexane

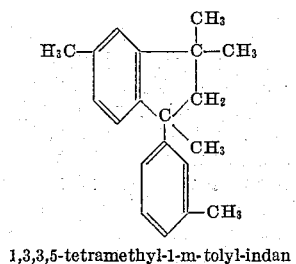

1,3,3,5-tetramethyl-1-m-tolyl-indan

Aromatic hydrocarbons which are useful as starting materials in this process contain two hydrocarbon group constituents in meta positions to one another. Also one of these substituents in the m-substituted hydrocarbon must have only one hydrogen atom combined with the carbon atom that is attached to the benzene ring. Accordingly, this hydrocarbon substituent which contains the tertiary hydrogen atom also contains at least three carbon atoms. These different aromatic hydrocarbons have structures which may be represented by the following formula:

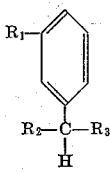

wherein each of $R_1$, $R_2$ and $R_3$ is selected from the group consisting of an alkyl radical, a cycloalkalkyl, a cycloalkyl radical, and a bicycloalkyl radical. The combination of the different R groups should be balanced so as to avoid steric hindrance. Also aromatic hydrocarbons and particularly benzene hydrocarbons containing more than three hydrocarbon substituent groups may also be used as starting material provided that such a hydrocarbon has a replaceable hydrogen atom combined with a nuclear carbon atom adjacent to the carbon atom which is combined with the group:

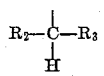

Such aromatic starting materials include m-cymene, 1-methyl-3-sec. butyl-benzene, 1-ethyl-3-isopropylcymene, isopropyl-p-xylene, etc.

Olefinic starting materials suitable for this hydrogen transfer process have branched chains and include such hydrocarbons as trimethylethylene, dihydrolimonene, methylcyclohexene, 1,1,3-trimethyl-cyclohexene, menthene, etc. The exact type of olefin to be used is dependent on the catalyst and the aromatic hydrocarbon with which the hydrogen transfer is to be effected. Thus n-octene and cyclohexene, namely, olefins not possessing branched chains, when reacted with a meta-dialkyl aromatic hydrocarbon at operating conditions similar to those used with the branched-chain olefins, effect alkylation but not hydrogen transfer.

In addition to the branched-chain monoolefins mentioned above, other olefin-acting compounds which are also utilizable in this process comprise conjugated diolefins containing a tertiary carbon atom, alcohols, ethers, esters of carboxylic acids, tertiary alkyl phenols including particularly tertiary butyl phenol, tertiary amyl phenol, tertiary and ditertiary alkyl benzenes such as di-tertiary amyl benzene, and the like which may be regarded as capable of forming branched-chain olefins in situ in the reaction mixture.

The process as herein described is carried out in the presence of an acid-acting catalyst at conditions necessary for the hydrogen transfer reaction. Suitable acid-acting catalysts include strong mineral acids, such as sulfuric acid, chlorosulfonic acid, fluorosulfonic acid, hydrogen fluoride, hydroxyborofluoric acids, fluorophosphoric acids, phosphoric acids; and Friedel-Crafts halide catalysts, particularly aluminum chloride, aluminum bromide, ferric chloride, zirconium chloride, and boron fluoride. Since in some cases Friedel-Crafts catalysts may cause an alkyl migration within the aromatic ring before the hydrogen transfer reaction occurs, it is sometimes advantageous to use Friedel-Crafts complexes, such as etherate, alcoholate, etc. for this reaction.

The operating conditions used in the process are dependent upon the nature of the hydrocarbons being treated and also upon the catalysts employed. When utilizing strong mineral acids, such as hydrogen fluoride, sulfuric acid, fluorosulfonic acid, chlorosulfonic acid, and the like, and also Friedel-Crafts metal halides promoted by a hydrogen halide such as hydrogen chloride, the process is carried out at a temperature of from about —30° to about 100° C., and at a pressure up to about 100 atmospheres. However, in the presence of hydrogen fluoride, sulfuric acid, and aluminum chloride catalysts the preferred operating temperature is generally from about 0° to about 50° C., while in contact with ferric chloride catalyst the preferred operating temperature is from about 50° to about 100° C.

Our process is carried out in either batch or continuous type of operation. In batch-type operation, the usual procedure consists in placing a mineral acid or Friedel-Crafts catalyst and a portion, generally about 50%, of the aromatic hydrocarbon in a reactor provided with a mechanically driven stirrer, cooling these materials to a temperature of from about 0° to about 10° C. and adding thereto with stirring, a solution of the olefin in the remainder of the aromatic hydrocarbon. The reaction mixture is then separated and the product is washed, dried, and distilled to separate therefrom the indan hydrocarbons. Unconverted aromatic hydrocarbons recovered in this distillation are utilizable in the further operation of the process.

The process is also carried out in a continuous manner by passing the aromatic and branched-chain olefinic hydrocarbons through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as a supported Friedel-Crafts type catalyst is used as a fixed bed in the reactor and the aromatic and cycloolefinic hydrocarbons are passed therethrough, the resultant hydrocarbon product generally requires no washing and drying treatment and may be distilled to separate therefrom unconverted aromatic and cycloolefinic hydrocarbons and to recover the desired indan hydrocarbons.

In order to obtain good yields of indan hydrocarbons by our process, it is necessary to use rather carefully selected hydrocarbon fractions as charging stocks. As already indicated herein, only certain types of aromatic hydrocarbons, namely those containing particular substituents are utilizable as starting materials to produce indan-type hydrocarbons. Thus m-isopropyltoluene, m-secondary butyl toluene, meta-diisopropylbenzene and other aromatic hydrocarbons containing alkyl groups in meta positions to one another react readily with branched-chain olefins to form an indan hydrocarbon and a saturated hydrocarbon, the latter having substantially the same carbon skeleton as that of the olefinic hydrocarbon charged to the process. An aromatic hydrocarbon which does not contain the aforementioned disubstitution in meta position does not react with a branched-chain olefin to give the desired hydrogen transfer reaction. Also an olefin which does not have a branched-chain such as is present in trimethylethylene, dihydrolimonene, methylcyclopentene, etc. acts as an alkylating agent for the aromatic hydrocarbon also charged to the process. Accordingly, in order to obtain hydrogen transfer rather than alkylation, it is necessary to use a branched-chain olefinic hydrocarbon together with a disubstituted benzene hydrocarbon in which the substituents are in meta position and one of said substituents comprises an isopropyl group or other hydrocarbon group in which a tertiary hydrogen atom is combined with the carbon atom adjacent to the aromatic nucleus.

The indans formed in this process may be sulfonated and hydrolyzed to form phenols or they may be nitrated and reduced to the corresponding amines. The amines may then be diazotized and converted into phenols which may be useful as inhibitors. The sulfonation product of an indan containing a long alkyl, cycloalkyl or cycloalkyl group may also be converted into a detergent by neutralization with a basic compound of an alkali metal. Some of the indan hydrocarbons formed in the process are also useful as additives to improve the viscosity characteristics of lubricating oils.

The following example is given to illustrate the character of the results obtained by the use of specific embodiments of the present invention, although the data presented are not introduced with the intention of unduly restricting the generally broad scope of the invention.

Thirty grams of m-cymene (prepared from m-bromotoluene with acetone via a Grignard reaction, followed by hydrogenation) were reacted with 10.8 grams of methylcyclohexene in the presence of 25 grams of hydrogen fluoride. The product obtained distilled as follows:

| Cut | Temp., °C. | Pressure, mm. | Weight, g. | $n_D^{20}$ |
| --- | --- | --- | --- | --- |
| 1 | 99–101 | Atm. | 1.6 | 1.4240 |
| 2 | 60–63 | 15 | 12.6 | 1.4920 |
| 3 | 100–115 | 5 | 5.6 | 1.5150 |
| 4 | 115–116 | 5 | 6.9 | 1.5195 |
| 5 | 116–134 | 5 | 2.5 | 1.5412 |
| 6 | 134–140 | 5 | 1.6 | 1.5552 |
| Bottoms | | | 1.3 | |

Cut 1—corresponds to methylcyclohexane.
Cut 2 = unreacted m-cymene.
Cut 3 and 4 = methylcyclohexyl-m-cymene.
Cut 5 and 6 = tetramethyl-1-m-tolyl-indan.

The tetranitro compound of cut 6 melted at 203° C. Anal. calc'd. for $C_{20}H_{20}N_4O_8$: C, 54.1; H, 4.5; N, 12.6. Found: C, 53.7; H, 4.6; N, 12.8. The 1,3,3,5-tetramethyl-1-m-tolyl-indan produced is a new compound.

We claim as our invention:

1. A process for producing an aryl indan hydrocarbon which comprises reacting at a hydrogen transfer temperature of from about −30° C. to about 100° C. in the presence of an acid-acting catalyst a branched-chain olefin and a meta-dialkylated aromatic hydrocarbon having as one substituent an alkyl group containing only one hydrogen atom joined to the carbon atom combined with the aromatic ring, the last-named hydrocarbon having a hydrogen atom combined with a carbon atom of the ring which is adjacent to the carbon atom of the ring which is combined with said alkyl group.

2. A process for producing an aryl indan hydrocarbon which comprises reacting at a hydrogen transfer temperature of from about −30° C. to about 100° C. in the presence of an acid-acting catalyst a branched-chain olefin and a meta-dialkyl benzene hydrocarbon having as one substituent an alkyl group containing only one hydrogen atom joined to the carbon atom combined with the benzene ring, the last-named hydrocarbon having a hydrogen atom combined with a carbon atom of the ring which is adjacent to the carbon atom of the ring which is combined with said alkyl group.

3. A process for producing an aryl indan hydrocarbon which comprises reacting at a hydrogen transfer temperature of from about −30° C. to about 100° C. in the presence of an acid-acting catalyst an alkyl cyclohexene hydrocarbon and a meta-dialkyl benzene hydrocarbon having as one substituent an alkyl group containing only one hydrogen atom joined to the carbon atom combined with the benzene ring, the last-named hydrocarbon having a hydrogen atom combined with a carbon atom of the ring which is adjacent to the carbon atom of the ring which is combined with said alkyl group.

4. A process for producing an aryl indan hydrocarbon which comprises reacting at a hydrogen transfer temperature of from about −30° C. to about 100° C. in the presence of a strong mineral acid catalyst, a branched-chain olefin and a meta-dialkyl benzene hydrocarbon having as one substituent an alkyl group containing only one hydrogen atom joined to the carbon atom combined with the benzene ring, the last-named hydrocarbon having a hydrogen atom combined with a carbon atom of the ring which is adjacent to the carbon atom of the ring which is combined with said alkyl group.

5. A process for producing an aryl indan hydrocarbon which comprises reacting in the presence of a strong mineral acid catalyst at a temperature of from about −30° to about 100° C. a branched-chain olefin and a meta-alkyl benzene hydrocarbon having as one substituent an alkyl group containing at least three carbon atoms and having only one hydrogen atom joined to the carbon atom combined with the benzene ring, the last-named hydrocarbon having a hydrogen atom combined with a carbon atom of the ring which is adjacent to the carbon atom of the ring which is combined with said alkyl group.

6. The process defined in claim 5 further characterized in that said branched-chain olefin comprises a branched-chain alkene.

7. The process defined in claim 5 further characterized in that said branched-chain olefin comprises an alkyl cycloolefin.

8. A process for producing an aryl indan hydrocarbon which comprises reacting in the presence of a strong mineral acid catalyst at a temperature of from about 0° to about 50° C. a branched-chain olefin and a meta-dialkyl benzene hydrocarbon having as one substituent an alkyl group containing at least three carbon atoms and having only one hydrogen atom joined to the carbon atom combined with the benzene ring, the last-named hydrocarbon having a hydrogen atom combined with a carbon atom of the ring which is adjacent to the carbon atom of the ring which is combined with said alkyl group.

9. A process for producing an aryl indan hydrocarbon which comprises reacting in the presence of a sulfuric acid catalyst at a temperature of from about 0° to about 50° C. a branched-chain olefin and a meta-dialkyl benzene hydrocarbon having as one substituent an alkyl group containing at least three carbon atoms and having only one hydrogen atom joined to the carbon atom combined with the benzene ring, the last-named hydrocarbon having a hydrogen atom combined with a carbon atom of the ring which is adjacent to the carbon atom of the ring which is combined with said alkyl group.

10. A process for producing an aryl indan hydrocarbon which comprises reacting in the presence of a hydrogen fluoride catalyst at a temperature of from about 0° to about 50° C. a branched-chain olefin and a meta-dialkyl benzene hydrocarbon having as one substituent an alkyl group containing at least three carbon atoms and having only one hydrogen atom joined to the carbon atom combined with the benzene ring, the last-named hydrocarbon having a hydrogen atom combined with a carbon atom of the ring which is adjacent to the carbon atom of the ring which is combined with said alkyl group.

11. A process for producing 1,3,3,5-tetramethyl-1-m-tolylindan which comprises reacting a branched-chain olefin and meta-cymene in the presence of an acid-acting catalyst at a hydrogen transfer temperature of from about −30° C. to about 100° C.

12. A process for producing 1,3,3,5-tetramethyl-1-m-tolylindan which comprises reacting a branched-chain olefin and meta-cymene in the presence of a strong mineral acid catalyst at a temperature of from about −30° to about 100° C.

13. A process for producing 1,3,3,5-tetramethyl-1-m-tolylindan which comprises reacting a branched-chain olefin and meta-cymene in the presence of a strong mineral acid catalyst at a temperature of from about 0° to about 50° C.

14. A process for producing 1,3,3,5-tetramethyl-1-m-tolylindan which comprises reacting a branched-chain olefin and meta-cymene in the presence of a sulfuric acid catalyst at a temperature of from about 0° to about 50° C.

15. A process for producing 1,3,3,5-tetramethyl-1-m-tolylindan which comprises reacting a branched-chain olefin and meta-cymene in the presence of a hydrogen fluoride catalyst at a temperature of from about 0° to about 50° C.

16. A process for producing 1,3,3,5-tetramethyl-1-m-tolylindan which comprises reacting a methylcyclohexene and meta-cymene in the presence of a hydrogen fluoride catalyst at a temperature of from about 0° to about 50° C.

VLADIMIR N. IPATIEFF.
HERMAN PINES.

REFERENCES CITED

The following references are of record in the file of this patent:

UNITED STATES PATENTS

| Number | Name | Date |
|---|---|---|
| 2,275,312 | Tinker et al. | Mar. 3, 1942 |
| 2,316,108 | Ruthruff | Apr. 6, 1943 |

OTHER REFERENCES

Puranen: Chem. Abs., vol. 27, 5062–3 (1933).
Barbier: Chem. Abs., vol. 26, 4035 (1932).